United States Patent [11] 3,587,053

[72] Inventors Joseph J. Horzepa
Colts Neck;
James J. Mansell, Fair Haven; Robert L. Simms, Jr., Colts Neck, all of, N.J.
[21] Appl. No. 735,747
[22] Filed June 10, 1968
[45] Patented June 22, 1971
[73] Assignee Bell Telephone Laboratories Incorporated Murray Hill, N.J.

[54] AUDIO VISUAL INFORMATION PROCESSING AND COMMUNICATION SYSTEM

5 Claims, 1 Drawing Fig.

[52] U.S. Cl. 340/172.5, 178/6.8
[51] Int. Cl. G06f 3/14, H04n 1/00
[50] Field of Search 178/6, 6.8; 325/38.1; 340/172.5; 235/157; 172/2, 15

[56] References Cited

UNITED STATES PATENTS

| | | | |
|---|---|---|---|
| 2,875,270 | 12/1959 | Wendt et al. | 340/172.5 X |
| 3,242,470 | 3/1966 | Hagelbarger et al. | 340/172.5 |
| 3,263,027 | 7/1966 | Beltrami | 178/6 X |
| 3,419,674 | 12/1968 | Burns et al. | 178/6 X |
| 3,453,384 | 7/1969 | Donner et al. | 178/6.8 |
| 3,457,371 | 7/1969 | Sharon | 340/172.5 X |

OTHER REFERENCES

" Ring Two-For Tomorrow," Martin W. Nabut, pp. 47—49 and pp. 64— 65, February 1968, ELECTRONICS WORLD.

" New Picture Telephone Goes Commercial," Milton S. Snitzer, pp. 38— 39 and 74, March, 1968, ELECTRONICS WORLD

*Primary Examiner*—Paul J. Henon
*Assistant Examiner*—Harvey E. Springborn
*Attorneys*—R. J. Guenther and Kenneth B. Hamlin

ABSTRACT: A visual communication system comprising a telephone switching system, a plurality of video telephone stations each connected to the system, and a data storage and computing machine also connected to the system via a data translator. A connection from any video telephone station may be established to any other station or to the data storage and computing machine by "dialing" or keying certain codes on a telephone set of the video station. After establishing a connection to the data storage and computing machine, instructions to the machine are keyed on the telephone set and transmitted via the system and data translator to the machine. In response thereto, the machine generates output signals which are applied to the data translator and there converted to video signals to be transmitted via the system to the originating station for display on the station's video set.

PATENTED JUN 22 1971 3,587,053
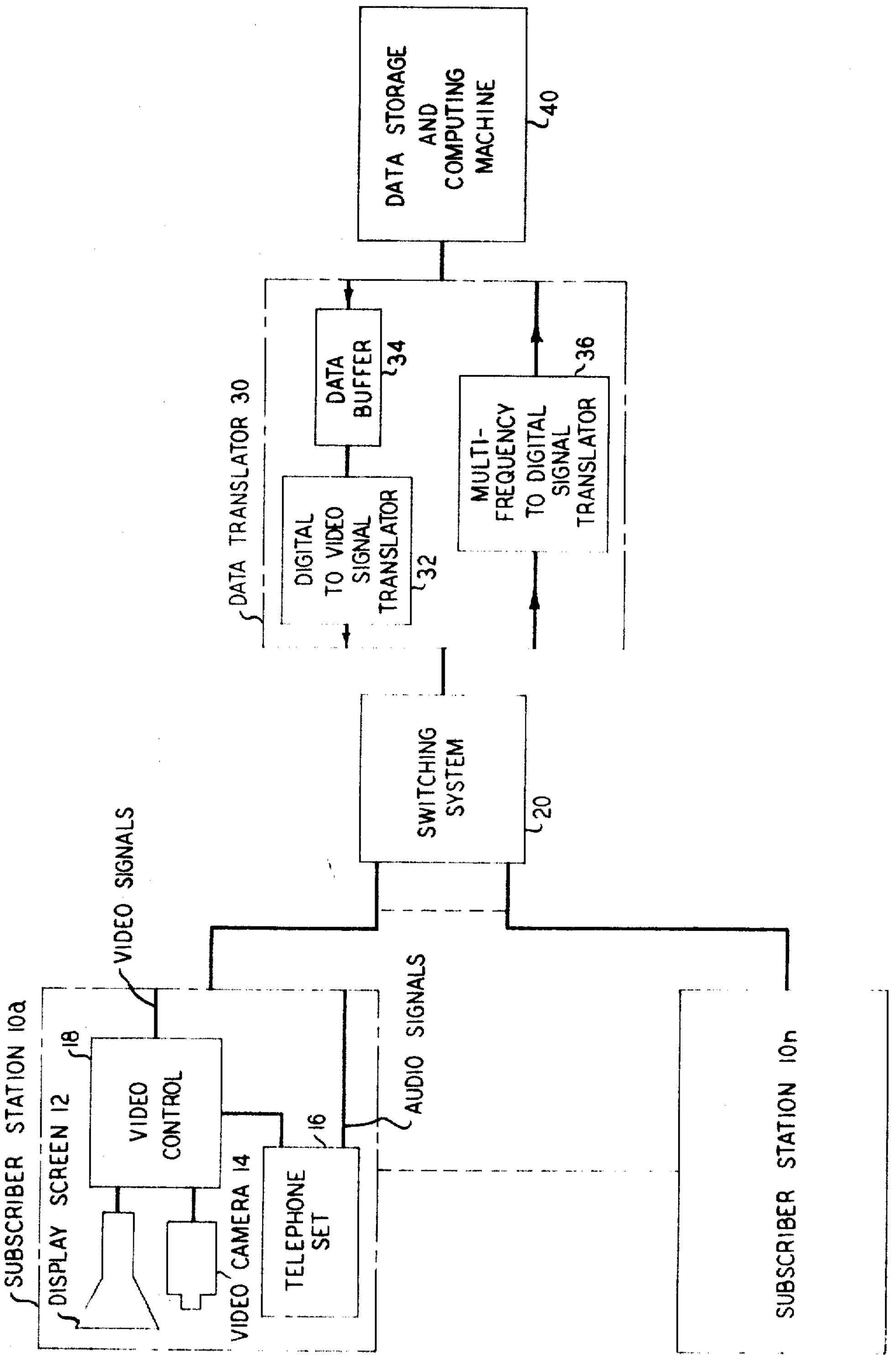
INVENTORS J. J. HORZEPA
J. J. MANSELL
R. L. SIMMS JR.
BY R. C. Lipton

AUDIO VISUAL INFORMATION PROCESSING AND COMMUNICATION SYSTEM

BACKGROUND OF THE INVENTION

1. Field of the Invention

This invention concerns communication systems generally, and visual communication and information storage and computing systems specifically.

2. Description of the Prior Art

The demand for various computer services has increased greatly in recent years. Such services generally include control of industrial processes, modeling or simulation, information handling such as inventory control and customer accounting and billing, and information storage and retrieval. The latter service—information storage and retrieval—was given increased impetus with the advent of the concept of time-shared information systems. Time-shared systems allow a plurality of users (including remotely located users) to share the services of a computer.

In time-shared information storage and retrieval systems, requests for information are usually generated using keyboard input devices specially installed at the user location. These requests are then transmitted via data transmission facilities to the computer. The computer receives and processes the requests and then transmits the requested information to the requesting user. At the user location, the retrieved information may be communicated to the user by various output devices, e.g., a cathode-ray tube display.

As indicated above, special facilities must be installed at each user location to enable the user to communicate with the computer. Such facilities are generally costly and when coupled with the cost of transmission facilities from the user location to the computer and a proportionate cost of the computer, the cost of the information storage and retrieval service for some potential users could be prohibitive. It would therefore be advantageous to either reduce the cost of the users special terminal and transmission equipment or provide equipment which could be used to provide valuable services in addition to the information storage and retrieval service.

SUMMARY OF THE INVENTION

In view of the above-described prior art systems, it is an object of the present invention to provide an inexpensive information storage and retrieval system.

It is another object of the present invention to provide an information storage and retrieval system wherein the customer's input/output equipment to the system may be utilized for other communication services in addition to information retrieval.

It is still another object of the present invention to provide a visual communication system wherein users may communicate with each other as well as obtain visual displays of information retrieved from a computer.

It is also an object of the present invention to provide an information storage and retrieval system comprising a standard telephone keying device as the user input and a standard video telephone display device as the user output.

These and other objects of the present invention are illustrated in a specific embodiment which comprises a telephone switching system capable of switching video as well as audio telephone channels, a plurality of customer stations connected to the switching system each including a video telephone set, and a storage and computing machine also connected to the switching system. Connections may be established from any customer station to any other station for visual and audio communication or to the computing machine for retrieval of information. A connection to the computing machine is established in the same manner as connections are established between two telephone customers. The customer "dials" or keys a certain code on his station apparatus which causes the switching system to establish a connection between the customer and the computing machine. The customer then utilizes his station apparatus to "dial" or key certain input information which is transmitted to the computing machine, and there processed. In response to this input, the machine generates an appropriate response—whether it be retrieved information or a solution to a mathematical problem—and transmits it via the switching system to the requesting customer for visual display.

It is a feature of this invention that the "dialed" or keyed input information is translated to digital signals which can be processed by the computing machine. The digital signal response of the machine is also translated to provide video signals suitable for display on the video telephone set.

BRIEF DESCRIPTION OF THE DRAWING

A complete understanding of the present invention and of the above and other objects and advantages thereof may be gained from a consideration of the following detailed description of a specific illustrative embodiment presented hereinbelow in connection with the accompanying drawing which shows an illustrative embodiment of a visual communication and information retrieval system made in accordance with the principles of the present invention.

DETAILED DESCRIPTION

Referring now to the drawing, there is shown a plurality of subscriber stations $10_a$—$10_n$ each connected to a switching system 20 which, in turn, is connected via a data translator 30 to a data storage and computing machine 40. Each subscriber station comprises a video telephone set which includes a video camera 14, a cathode-ray tube display screen 12, video control circuitry 18 and a standard telephone set 16 capable of generating multifrequency signals. The subscriber stations advantageously comprise a video telephone set such as that described in Bell Laboratories Record, Vol. 42, No. 4, Apr. 1964, pages 114—120. The multifrequency telephone signaling set of the video telephone set advantageously comprises the station set described in I.E.E.E. Transaction, Part I, Communications and Electronics, Mar., 1963, pages 9—17.

Each subscriber may initiate a connection with any other subscriber station served by the switching system 20 by simply "dialing" or keying an appropriate code on the telephone set 16. This keying causes the generation of switching signals which are transmitted via the lead labeled "audio signals" to the switching system 20 and there processed. The switching system 20 typically comprises a system of the type disclosed in U.S. Pat. No. 3,335,226 to H. J. Michael et al., issued Aug. 8, 1967. Alternatively, a time division telephone system disclosed in U.S. Pat. No. 3,226,484 to D. B. James, issued Dec. 28, 1965 which provides for switching video telephone channels as well as audio channels is typically used as switching system 20. The switching system 20 after processing the switching signals, establishes a video connection between the initiating subscriber station and the station specified by the "dialed" code. After the connection is established, the two subscribers may communicate with each other visually as well as orally as described in the aforecited Bell Laboratories Record reference.

Each subscriber may also establish a connection between his station and the data storage and computing machine 40 for either information retrieval or computational services. Such a connection is likewise established by keying an appropriate code on the telephone set 16. The switching signals generated thereby are processed by the switching system 20 which establishes a connection between the initiating station and the data storage and computing machine via the data translator 30. The data storage and computing machine illustratively comprises any general purpose computer, e.g., the IBM 360—40 computer. A translator 36 detects the origination of the call, e.g., by detecting ringing current applied by the switching system 20 and signals the data storage and computing machine 40 that a connection is established. In response to this signal, the computing machine 40 generates a set of instructions to guide the subscriber in the use of the computer service. These instructions, in the form of digital output signals, are applied to a data buffer 34 and then to a digital to video signal translator 32 where the digital signals are converted to video signals. The translator 32 illustratively comprises a video generator circuit, of the type disclosed in DATANET-750, Volume 2, Installation and Maintenance, Dec. 1965, General Electric Co., pp. 2—68 to 2—72. The video signals are then transmitted via the switching system 20 to the initiating subscriber station where the instructions are displayed on the display screen 12. Such instructions might, for example, indicate what types of information may be retrieved and how to retrieve it, what types of arithmetic or mathematical calculations may be performed and instructions for performing, etc.

Instructions to the computing machine 40 are keyed on the telephone (i.e., multifrequency signals are generated) and transmitted via the switching system 20 to the data translator 30. The translator 36 translates the multifrequency signals to digital input signals and applies them to the computing machine 40. The translator 36 advantageously comprises a multifrequency receiver and translator as described in the aforecited I.E.E.E. reference, pages 9—17. See also I.E.E.E. Transactions on Communications Technology, Dec. 1967, pp. 812—824. The computing machine processes these signals and generates a digital output response which is applied to the data buffer 34 and subsequently to the translator 32 for translation of digital signals to video signals. The video signals, as before, are transmitted to the initiating station for display.

Thus, any subscriber may utilize the same video display apparatus either for visually communicating with another subscriber or for retrieving information from a data storage and computing machine.

It is noted that a detailed circuit configuration for unit 34 shown in the drawing has not been given because its arrangement is considered to be clearly within the skill of the art. Exemplary implementation for units 12, 14, 16, 18, 20, 32, 36 and 40 have already been given hereinabove.

Finally, it is to be understood that the above-described arrangement is only illustrative of the application of the principles of the present invention. Numerous other arrangements may be devised by those skilled in the art without departing from the spirit and scope of the invention. For example, a plurality of data translators 30 might be provided to enable simultaneous access by the subscribers to the data storage and computing machine 40, which would process the multiple calls on a time-shared basis.

We claim:

1. A visual communication system comprising
   - a plurality of video telephone stations, each of said stations comprising video display apparatus and means for generating switching signals,
   - a data storage and computing machine arranged to process digital input signals and arranged to generate digital output signals in response thereto,
   - a data translator including means for translating switching signals into digital input signals, means for applying said digital input signals to said data storage and computing machine, and means for translating digital output signals received from said data storage and computing machine into video signals, and
   - a telephone switching system arranged to establish communication channels between said stations and between said stations and said translation means in response to said switching signals, said channels being arranged to transmit switching signals from said stations to said translation means and to transmit video signals from said translation means to said stations.

2. A visual communications system comprising a plurality of video telephone stations, each of said stations comprising video display apparatus and means for generating switching signals, and a switching system interconnecting each of said stations to any other station in response to switching signals generated at said stations, characterized in that said system further comprises a computer for processing input signals and for generating output signals in response thereto, and a translation means interconnecting said switching system with said computer including means for translating switching signals received via said system from said stations into input signals to be applied to said computer and means for translating output signals from said computer into video signals to be applied to said system for transmission to said stations and display thereat.

3. A video telephone communication system comprising
   - a plurality of subscriber stations, each including a video telephone set having means for generating multifrequency signals,
   - a switching system interconnecting said stations in response to said multifrequency signals generated at said stations,
   - data storage and computing means for processing digital input signals and for generating digital output signals in response thereto,
   - means interconnecting said switching system and said data storage and computing means for translating station generated multifrequency signals received from said system into digital input signals and for applying said digital input signals to said data storage and computing means,
   - buffer means for receiving and registering digital output signals received from said data storage and computing means, and
   - means for translating digital output signals received from said buffer means into video signals and for applying said video signals to said switching system, for transmission to said stations, said switching system being further arranged to connect any one of said stations, for operation with said data storage and computing means, to each of said translating means in response to multifrequency signals generated by said station.

4. An information storage and retrieval system comprising a plurality of data retrieval stations, each of said stations having video display apparatus and means for generating inquiry signals, a data storage and computing machine arranged to process digital input signals and arranged to generate digital output signals in response thereto, translation means connected to said data storage and computing machine for translating inquiry signals into digital input signals for application to said machine and for translating digital output signals received from said machine into video signals, and means interconnecting each of said stations to said translation means for transmitting inquiry signals generated by said stations to said translation means and for transmitting video signals from said translation means to said stations for display on said display apparatus characterized in that said stations each further comprise a telephone set and a video camera arranged to generate audio signals and video signals, respectively, and said interconnecting means further includes means responsive to said inquiry signals for interconnecting any of said stations to any other station for the transmission of video and audio signals therebetween.

5. An information storage and retrieval system in accordance with claim 4 wherein said interconnecting means further includes means responsive to said inquiry signals for selectively interconnecting any of said stations to said translation means for the transmission of video and inquiry signals between said stations and said translation means for operation with said data storage and computing machine.